United States Patent
Allison et al.

(10) Patent No.: US 7,350,088 B2
(45) Date of Patent: Mar. 25, 2008

(54) POWER MANAGEMENT SYSTEM FOR UPS ATTACHED TO EXTERNAL DEVICES

(75) Inventors: Michael S. Allison, Fort Collins, CO (US); Edward A. Cross, Fort Collins, CO (US); John W. Hover, Fort Collins, CO (US); Bradley D. Winick, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 408 days.

(21) Appl. No.: 11/075,409

(22) Filed: Mar. 8, 2005

(65) Prior Publication Data

US 2006/0206741 A1    Sep. 14, 2006

(51) Int. Cl.
*G06F 1/00* (2006.01)
*G06F 11/00* (2006.01)

(52) U.S. Cl. .................. 713/300; 714/14; 714/24
(58) Field of Classification Search .......... 713/300, 713/340; 714/14, 24; 307/38
See application file for complete search history.

(56) References Cited

U.S. PATENT DOCUMENTS

| | | | |
|---|---|---|---|
| 3,081,827 A * | 3/1963 | Giles | ................ 172/677 |
| 5,155,842 A | 10/1992 | Rubin | |
| 5,319,571 A * | 6/1994 | Langer et al. | ............. 713/300 |
| 5,381,554 A * | 1/1995 | Langer et al. | .............. 714/14 |
| 5,717,934 A | 2/1998 | Pitt et al. | |
| 5,747,889 A | 5/1998 | Raynham et al. | |
| 5,793,124 A | 8/1998 | Mitzaki | |
| 6,184,593 B1 | 2/2001 | Jungreis | |
| 6,255,744 B1 | 7/2001 | Shih et al. | |
| 6,304,981 B1 | 10/2001 | Spears et al. | |
| 6,694,453 B1 * | 2/2004 | Shukla et al. | ............... 714/24 |
| 6,728,601 B2 | 4/2004 | Garcia et al. | |
| 6,996,746 B2 * | 2/2006 | Shukla et al. | ............... 714/24 |
| 2004/0032168 A1 | 2/2004 | Allison et al. | |

OTHER PUBLICATIONS

IBM, Power Fail Notification And Controlled Shut Down of Computer Systems, May 1, 1991, vol. 33, Issue 12, p. 4*

* cited by examiner

*Primary Examiner*—Suresh K Suryawanshi (57) ABSTRACT

Systems, methodologies, media, and other embodiments associated with power management are described. One exemplary system embodiment includes an uninterrupted power supply (UPS) manager logic configured to determine a power status of one or more UPS devices attached to one or more external peripheral devices. The UPS manager logic can be configured to notify an appropriate operating system of a power loss to a selected external device.

20 Claims, 7 Drawing Sheets

POWER MANAGEMENT SYSTEM FOR UPS ATTACHED TO EXTERNAL DEVICES

BACKGROUND

The reliability and quality of a computer system depends on properly protecting hardware components of the computer system against power disturbances. Power disturbances can be divided into several categories. Noise or static is a minor disturbance characterized by a small change in voltage. A transient, sometimes called a spike or surge, is a disturbance characterized by a very short, but extreme burst of voltage. Brownouts and blackouts are severe disturbances characterized by the temporary drop and complete loss of electric power, respectively.

Of these disturbances, blackouts pose a serious threat to today's computer systems, which heavily rely on volatile memory components that are particularly susceptible to power interruptions. Prior to shutting down a computer system, it is important to ensure that no portion or segment of the system is in a condition of instability. In a blackout, a complete power interruption causes the instant shutdown of a computer system thereby disrupting and destabilizing the transfer and storage of data. The data may be lost or corrupted or placed in an unpredictable form.

Computer systems have been designed to avoid power interruptions and to maintain extended availability or "uptime." To extend availability, computer systems can include uninterrupted power supplies (UPSs) that are typically equipped with a battery and a loss-of-power sensor. When the UPS detects a power failure, it switches to battery power so that the computer system may remain operational. If power does not resume, the UPS may send a power loss notification to the computer system so that an orderly and graceful shutdown of the computer system can be performed. However, some power failures may not affect all components of a system and shutting down the entire system may not be necessary.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems, methods, media and other embodiments are described herein that relate to power management in a computer system. In various examples, the computer system will be based on an example configuration that includes one or more external peripheral devices that are powered independently from the computer system and include at least one uninterrupted power supply (UPS). The uninterrupted power supply can be configured to provide backup power to the external peripheral device in case a power loss occurs with the power supply.

In one example embodiment, a power management logic is configured to monitor the one or more UPSs connected to the external peripheral devices. In the event of an upcoming total power loss for a particular external device (e.g. primary power supply has stopped and backup power supply from the UPS is near expiration), the power management logic can be configured to notify an operating system instance within the computer system that is configured to control the particular external peripheral device. The total power loss notification causes the operating system instance to shut down operation of the particular external device without shutting down the entire computer system. In this manner, the computer system can remain functional and available for use even though one or more external peripheral devices may have lost power.

In the event that power is re-applied to the external peripheral device, the operating system instance can be notified by the power management logic and operation of the external peripheral device can be reestablished. Other embodiments will be described with reference to the accompanying figures.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Operating system instance", as used herein, includes but is not limited to a computer executable copy of an operating system that can be loaded and executed by a computer. Like many computer executable programs, multiple copies of the operating system can be running/executing simultaneously. Each executing copy can be regarded as an instance of the operating system.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as data, bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like monitoring, determining, notifying, identifying, processing, displaying, or the like, refer to actions and processes of a computer system, logic, processor, or similar electronic device that manipulates and transforms data represented as physical (electronic) quantities.

Figure 1:
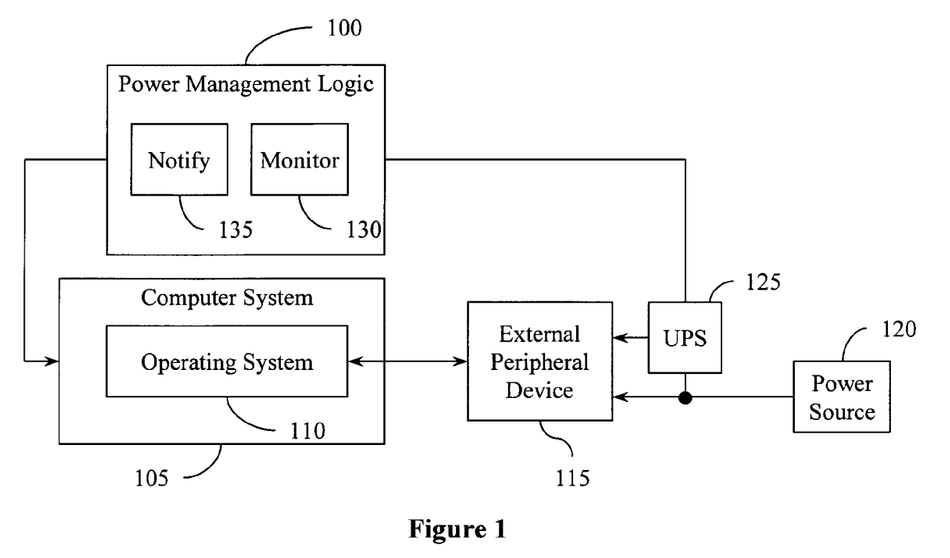
FIG. 1 illustrates one embodiment of a power management logic that can operate with a computer system having UPS devices attached to external peripherals.

FIG. 1 illustrates one embodiment of a power management logic 100 that can be configured to monitor power sources and provide various notification signals to a computer system 105. FIG. 1 is illustrated showing logical relationships between components. The computer system 105 is illustrated in a simplified form and can include at least one or more processing units, an operating system 110, and at least one external peripheral device 115. The external peripheral device 115 is configured to be separately powered by a power source 120 such as an alternating current (AC) power line and is configured with at least one uninterrupted power supply (UPS) 125. The UPS 125 can be configured, for example, to include a backup power supply (e.g. a battery) and a detection logic that detects whether the power source 120 is supplying power. If the power source 120 loses power, the UPS 125 is configured to continue supplying power to the external peripheral device 115 from its battery.

In the computer system 105 or similar systems, the power management logic 100 can be configured to monitor a power status from the UPS 125 and notify the operating system 110 of an upcoming power loss and/or a power resumption. By knowing where the power loss occurs, the computer system 105 can isolate a shut down of affected components while continuing to operate and be available to users rather than shutting down the entire system. The power management logic 100 can be useful when multiple peripheral devices and multiple UPS devices are connected to the computer system 105 and where the devices are located in different rooms, different buildings, or other remote locations.

In one example, the power management logic 100 can include a monitor logic 130 configured to communicate with the UPS 125 (or multiple UPSs if present) to receive power status data. Example power status data can include information that identifies the UPS, indicates whether the power source 120 is on/off, indicates how much time remains in the battery backup power, and the like. A notice logic 135 can be configured to generate and transmit appropriate notification signals to the operating system 110 based on the power status data. In the case of a power loss, the notification can cause the operating system 110 to safely shut down the external peripheral device 115 before power loss occurs. This allows the operating system 110 to save appropriate data and take other necessary shutdown steps in accordance with the type of external peripheral device 115.

It will be appreciated that different types of operating systems and different types of peripheral devices may need different amounts of time to shut down. Thus, the power management logic 100 can be configured to take these time requirements into consideration when determining when to send a shutdown notice to the operating system 110.

In another example, the computer system 105 can include one or more input/output (I/O) cards (e.g. PCI cards) that function as an interface between the operating system 110 and the external peripheral device 115. During a shutdown operation, the operating system 110 can shut down the effected I/O card so that no additional transactions can occur through the I/O card.

The power management logic 100 can be configured or embodied in various forms. For example, the logic 100 can be embodied as a computer-readable medium that provides computer executable instructions that function with the computer system 105. The logic 100 may be embodied as an internal or external computer component of the computer system 105. In another embodiment, the power management logic 100 may be embodied as a software application that is executable on the operating system 105. The logic 100 may also be embodied as a firewall configured to isolate Internets between multiple operating system instances that may execute on the computer system 105. Other forms will be readily appreciated by those skilled in the art.

Figure 2:
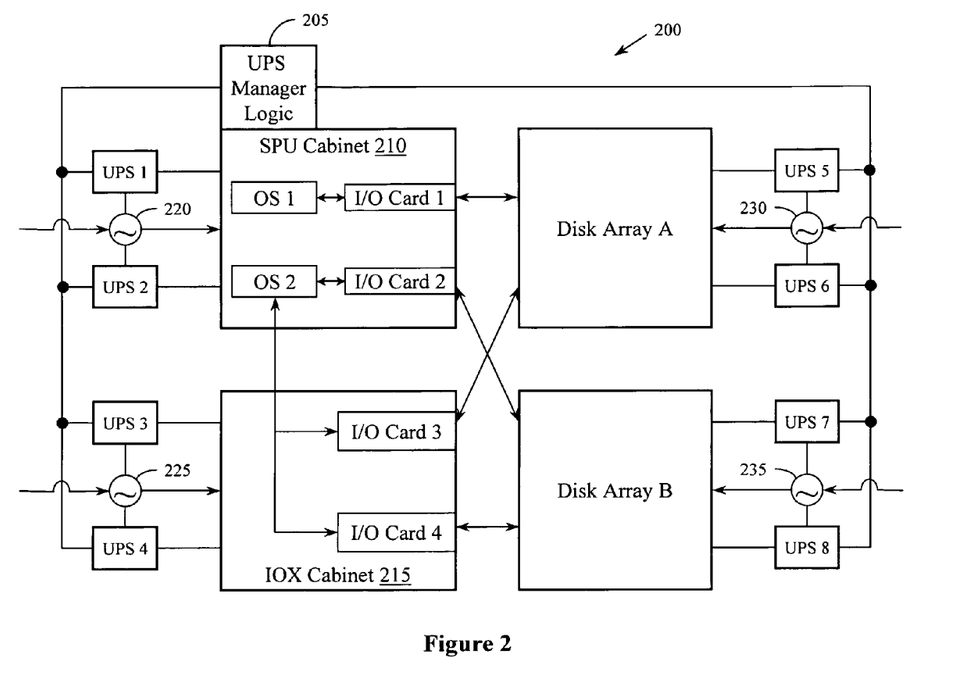
FIG. 2 illustrates another embodiment of a system having a UPS manager logic for UPS devices attached to external I/O devices.

Illustrated in FIG. 2 is one example embodiment of a computer system 200 that is configured with an uninterrupted power supply (UPS) manager logic 205. The computer system 200 can include a system processor unit (SPU) cabinet 210 having one or more central processing units and one or more operating system instances (e.g. OS1, OS2 . . . ). The computer system 200 may include one or more external peripheral devices like an input/output expansion (IOX) cabinet 215, a disk array A, a disk array B, and/or other types of input/output peripherals.

To facilitate communication and control between the computer system 200 and the external peripherals, one or more input/output (I/O) cards can be provided such as I/O card 1, 2, 3 and 4. In the example configuration, I/O card 1 and 3 are configured to communicate with disk array A while I/O cards 2 and 4 are configured to communicate with disk array B. Furthermore, operating system instance 1 (OS1) is configured to communicate with I/O card 1 and thus disk array A. Operating system instance 2 (OS2) is configured to operate with I/O cards 2, 3, and 4 and thus can operate with both disk array A and B. Of course, other configurations and associations between I/O cards, operating system instances, and external I/O devices can be implemented.

The computer system 200 can also be configured with one or more uninterrupted power supplies (e.g. UPS 1-8). Of course, any number of UPSs can be provided. Each UPS can be configured to provide a backup power supply in case of a power failure from a primary power source. In the computer system 200, one or more components can be powered by separate power sources. For example, SPU cabinet 210 is powered by alternating current (AC) power source 220, the IOX cabinet 215 is powered by AC power source 225, disk array A is powered by AC power source 230, and disk array B is powered by AC power source 235.

Each component (e.g. external I/O device) can be operatively connected to zero or more uninterrupted power supplies (UPSs). A UPS can be configured to detect a power status of a corresponding power source and provide a backup power supply in case the power source fails. For example, SPU cabinet 210 can be operatively connected to UPS 1 and UPS 2 that can detect the power status of AC power source 220. The IOX cabinet 215 can be connected to UPS 3 and UPS 4 that can be configured to detect a power status of the AC power source 225. Disk array A and B have similar configurations. It will be readily appreciated that many alternate arrangements are possible for configurations of power sources, UPS connections, I/O devices, and the like. As such, the illustrated examples are not intended to be limiting.

With continued reference to FIG. 2, in one embodiment, the UPS manager logic 205 can be operatively connected with each of the UPS devices (UPS 1-8) such as by a network connection. Each of the UPS devices 1-8 can be configured to provide various information relating to the power status of its corresponding AC power source and a status of its own backup power supply. As one example, power status signals may include data that indicates when the battery life of a UPS will expire. In general, the power status signals from a UPS device can include a variety of information such as data that identifies the UPS, a time remaining until the backup power expires, a power resumption signal that indicates that power has been restored to an external I/O device, and the like. This type of data can be used by the UPS manager logic 205 to determine whether it is necessary to notify a particular operating system instance of an upcoming total power loss for a selected external device.

In general, the UPS manager logic 205 can be configured to determine when a total power loss will occur for selected external peripheral devices connected to the computer system 200. A total power loss represents when the primary power source fails and all backup power supplies expire. For example, if the UPS manager logic 205 determines that disk array A is powered by a backup power supply from UPS 5 and/or UPS 6 and that the backup power supply will expire in one hour, the UPS manager logic 205 can be configured to transmit a total power loss notification to operating system instance OS1 at any desired time before the actual total power loss.

The total power loss notification allows the operating system instance OS1 to save all appropriate data and perform a safe shutdown of I/O card 1 so that no further transactions can occur to disk array A. In one embodiment, shutting down the operation of an I/O card can be performed using an on-line delete (OL/D) operation that takes the I/O card off-line. Likewise, the UPS manager logic 205 can send the notice to operating system instance OS2, which also operates with disk array A through I/O card 3. The power loss notice will cause the operating system instance OS2 to properly shut down the I/O card 3, which will result in prohibiting further transactions with disk array A.

In the event that power is resumed to disk array A, the UPS manager logic 205 can be configured to transmit a notice to the effected operating system instance(s) so that the operation of the appropriate I/O card(s) can be reestablished. In one embodiment, reestablishing operation of an I/O card can be performed using an on-line add or restore operation that brings the I/O card back on-line.

The UPS manager logic 205 can be configured or embodied in various forms. In one embodiment, the UPS manager logic 205 can be configured to persist across all operating system instances so that a backup UPS logic can exist. This can be implemented, for example, by allowing the logic 205 to exist in the SPU cabinet 210 independent of the operating system instances, or be redundant across one or all of the operating system instances. It will be appreciated that the preceding examples can also apply to the power management logic 100 of FIG. 1 and other components described herein.

Figure 3:
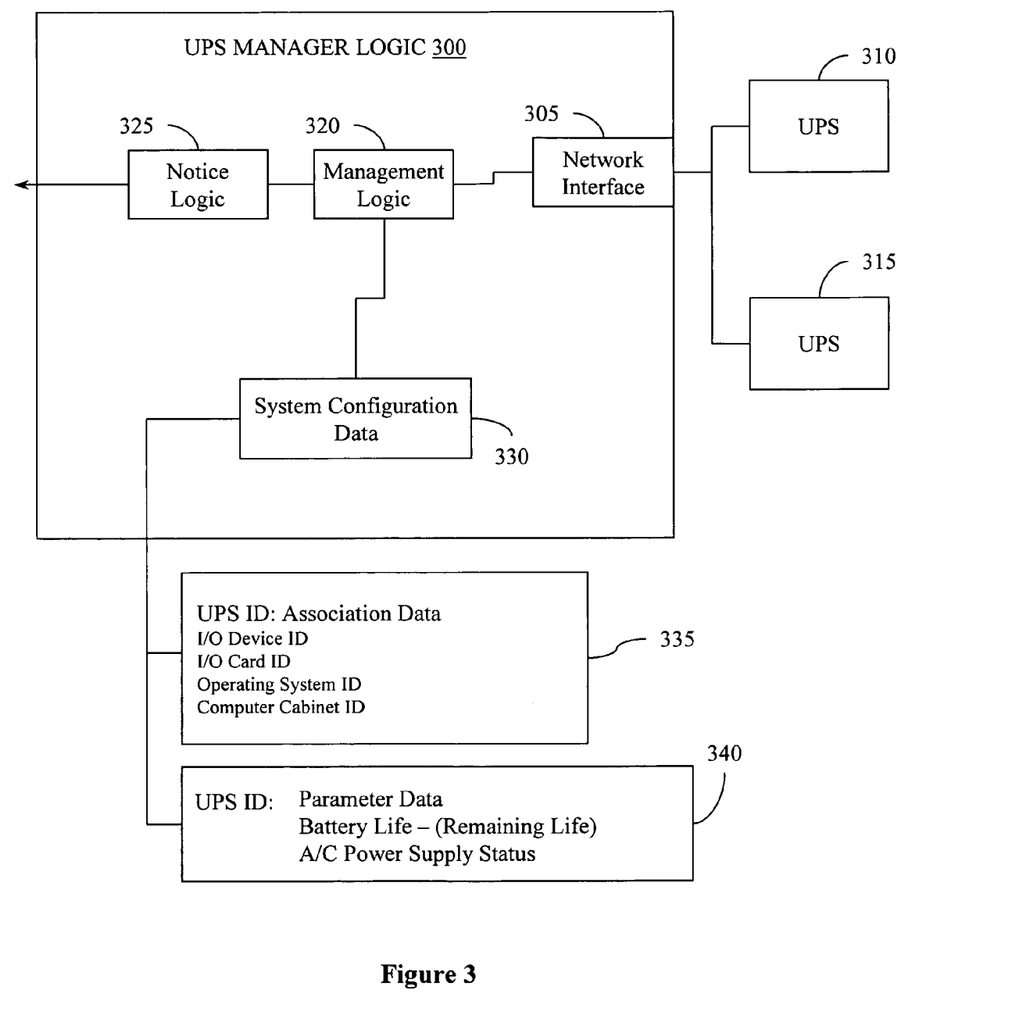
FIG. 3 illustrates another embodiment of a UPS manager logic.

With reference to FIG. 3, one embodiment of a UPS manager logic 300 is shown that may be implemented for the UPS manager logic 205 from FIG. 2 and/or the power management logic 100 shown in FIG. 1. The UPS manager logic 300 can include a network interface 305 configured to establish communications with one or more uninterrupted power supplies (e.g. UPS 310, 315) that may be connected to a computer system. A management logic 310 can be configured to receive signals from the UPS devices 310 and 315 such as power status data, and determine what actions to take. As previously described, the power status data can include an identifier (ID) that identifies the source of the signals (e.g. ID of the UPS transmitting the data), data that indicates an expiration of backup power, and the like.

The UPS manager logic 300 can also include a notice logic 325 configured to transmit notice signals to an appropriate operating system that will be affected by the power loss of an external I/O device. An example notice signal can include a device shutdown notice that is transmitted to an identified operating system instance that indicates an upcoming total power loss for a selected external device. The device shutdown notice can be configured to cause the identified operating system instance to shut down the selected external device. It will be appreciated that the management logic 320 and the notice logic 325 can be a single logic.

In one embodiment, to facilitate identification of the components that will be affected by a power loss, system configuration data 330 can be provided. The system configuration data 330 can take many forms and may include various types of data desired to be used, and can be implemented as any type of data store. In one embodiment, the system configuration data 330 can include data such as UPS association data 335 that can identify relationships and/or connections between components in a computer system. The association data 335 can be arranged by UPS identifiers (UPS IDs), by I/O device ID, and/or in other manners.

The association data 335 can be maintained, for example for each UPS device, for each external I/O device, or other desired format. It will be appreciated that the general purpose of the association data 335 is to allow the UPS manager logic 300 to identify the components that will be affected by a power loss by knowing which UPS device transmitted the power loss signal. As such, the management logic 320 can further include logic configured to use the system configuration data 330 to perform the identification and identify which operating system instances should receive a power loss/resumption notice.

The system configuration data 330 can also include parameter data 340. The parameter data 340 can provide information about selected UPS devices such as battery life or remaining battery life, a power supply status of a primary power source (e.g. A/C power), and/or other operating characteristics of a UPS. The parameter data 340 can be arranged, for example, by UPS identifier (UPS ID) or other manner.

With further reference to FIG. 3, one example of the association data 335 can include, for each UPS device connected to the system, its UPS ID, identify the external I/O devices connected to the UPS device, an identifier of the I/O card (I/O card ID) that controls the I/O device, an operating system ID that identifies the operating system instance that controls the I/O card, the computer cabinet ID of the computer system in which the operating system executes in, or other desired information.

Using the computer system 200 shown in FIG. 2 as an example, the association data that can be created for UPS 5 can include:

I/O device=disk array A;

I/O card ID=I/O card 1 with OS ID=operating system instance OS1;

I/O card ID=I/O card 3 with OS ID=operating system instance OS2;

Computer cabinet ID=ID for SPU cabinet 210.

Thus, upon receiving a power loss signal from UPS 5, the UPS manager logic 205 can determine the effected components of the power loss and send an appropriate notice to operating system instance OS1 to shut down I/O card 1. A notice would also be sent to operating system instance OS2 to shut down I/O card 3.

With reference again to FIG. 3, once the UPS manager logic 300 identifies the effected UPS device, the logic 300 can use the parameter data 340 to make additional decisions if needed. For example, data relating to the battery life or remaining time that the battery will supply power can be retrieved from the parameter data 340 based on a UPS ID. Knowing some characteristics of the UPS, the management logic 320 can be configured to use a threshold value in order to determine when a shutdown notice is needed to be transmitted to the effected operating system. For example, if two hours remains in the battery life of a UPS device, it may not be necessary to notify the operating system at that time. If the operating system only needs one minute to properly shut down an I/O device, a notice can be sent prior to that time. Since the parameters and other data in the system configuration data 330 can change over time (and need to be initially configured), one embodiment for managing the system configuration data 330 is described with reference to FIG. 4.

Figure 4:
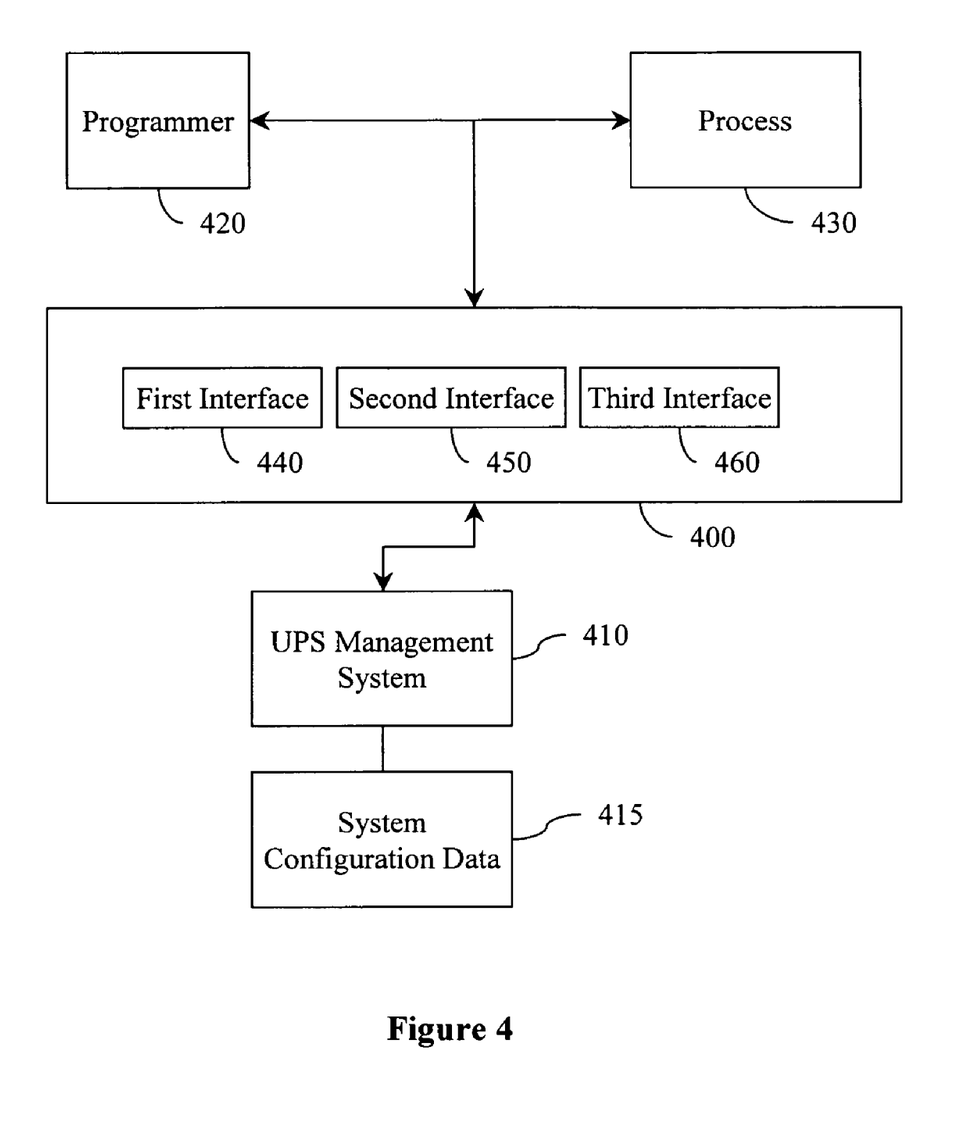
FIG. 4 illustrates one embodiment of an example application programming interface (API).

Referring now to FIG. 4, an application programming interface (API) 400 is illustrated that be used to provide access to a UPS management system 410 for managing system configuration data 415 that relates to UPS devices. The UPS management system 410 can represent any of the previous power management or UPS manager logics and the system configuration data can represent configuration data 330 shown in FIG. 3, for example.

The API 400 can be employed, for example, by a programmer 420 and/or a process 430 to gain access to processing performed by the system 410. For example, a programmer 420 can write a program to access the system 410 (e.g., invoke its operation, monitor its operation, control its operation) where writing the program is facilitated by the presence of the API 400. Rather than programmer 420 having to understand the internals of the system 410, the programmer 420 merely has to learn the interface to the system 410. This facilitates encapsulating the functionality of the system 410 while exposing that functionality. In particular, the API 400 can be configured to allow a user to manage the system configuration data 415 such as by defining and modifying associations between components like UPSs, external I/O devices, operating system instances, and/or other types of connections between components that are part of a computer system. The API 400 can also allow a user to define and modify parameter data for UPS devices like the parameter data 340 shown in FIG. 3. Of course, other types of data can be used. It will be appreciated that the system configuration data 415 can be configured and maintained as any desired type of data store.

The API 400 can also be employed to provide data values to the system 410 and/or retrieve data values from the system 410. For example, a process 430 that processes UPS configuration data can provide such data to the system 410 via the API 400 by, for example, using a call provided in the API 400. Thus, in one example of the API 400, a set of application programming interfaces can be stored on a computer-readable medium. The interfaces can be employed by a programmer, computer component, logic, and so on to gain access to the system 410 for managing system configuration data relating to UPS devices and associations to external I/O devices.

The interfaces can include one or more of, but are not limited to, a first interface 440 that communicates UPS association data, a second interface 450 that communicates UPS parameter data, and a third interface 460 that communicates a instruction data derived from the UPS association data and/or the parameter data. The instruction data can be used to cause a computer to define and/or modify the UPS system configuration data 415 based on a user's input. The UPS association data can include data that identifies relationships and/or connections between, for example, UPSs, external I/O devices, operating system instances, I/O cards, and the like. Of course, the interfaces 440, 450, and 460 can be combined or separated into a lesser or greater number of interfaces, and can include a graphical user interface if desired. For example, one or more executable programs can be implemented.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 5:
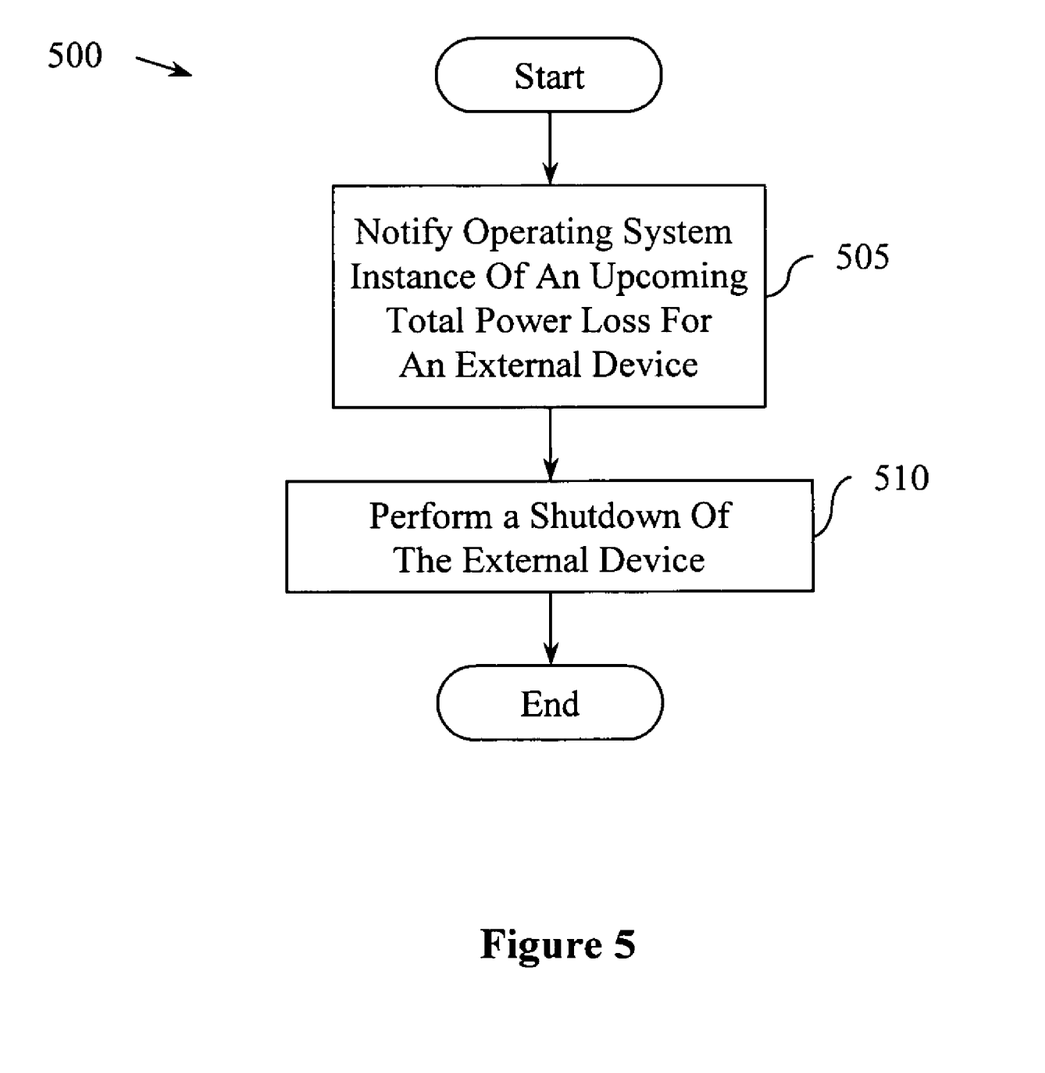
FIG. 5 illustrates an example method for notifying an operating system of a power loss.

Illustrated in FIG. 5 is on embodiment of a methodology 500 that can be associated with a UPS power management system. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 5, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing.

With reference to FIG. 5, the methodology 500 that can be associated with a power management system that can operate with a computer system. The computer system can include one or more external I/O devices that may be separately powered and are connected to one or more uninterrupted power supplies (UPS) similar to any of the previously illustrated embodiments. For example, in response to receiving a signal of an upcoming total power loss, the method 500 can include notifying an operating system instance of the upcoming total power loss for the external device (Block 505). A shutdown of the external device can then be performed (Block 510). By providing this type of notice before total power loss occurs, the operating system can attend to safely shut down the external device so that data can be appropriately saved and can prohibit further operations with the external device. By only shutting down the external device (e.g. shutting down an I/O card), the computer system, and thus the operating system and other I/O devices, can continue to be available rather than shutting down the entire computer system.

Figure 6:
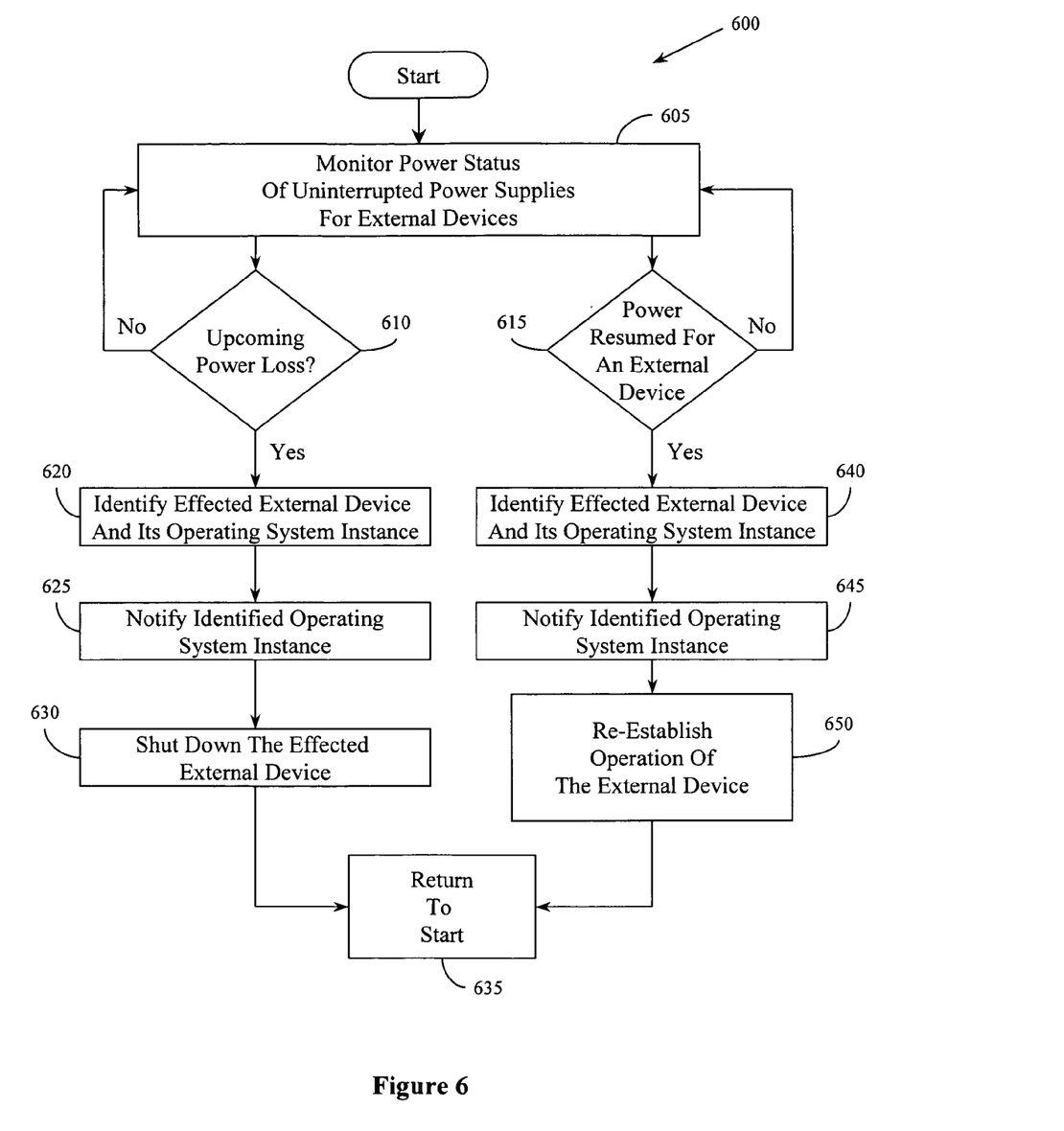
FIG. 6 illustrates one embodiment of a methodology that can be association with monitoring UPS devices and providing notice of power loss and power resumption.

Illustrated in FIG. 6 is another embodiment of a methodology 600 that can be associated with both notifying an operating system of a power loss and of a restored power.

For example, the methodology 600 can include monitoring power statuses of uninterrupted power supplies for external devices (Block 605). Two paths may be taken from Block 605 depending on whether an upcoming power loss is occurring (Block 610) or whether power has resumed for an external device (Block 615). If an upcoming power loss is to occur (Block 610), the process identifies the external device and its operating system instance (Block 620). The identified operating system instance is then notified (Block 625) and the effected external device is shut down (Block 630). The process can then return to "start" (Block 635) to continue monitoring the power status of UPS devices (Block 605).

If at Block 615 it is determined that power has been resumed for an external device, the process identifies the effected external device and its operating system instance (Block 640). The identified operating system instance can then be notified (Block 645) and operation of the external device can be reestablished (Block 650). This can include, for example, bringing an I/O card back on-line. The process can then return to "start" (Block 635) to continue monitoring the power status of UPS devices.

Figure 7:
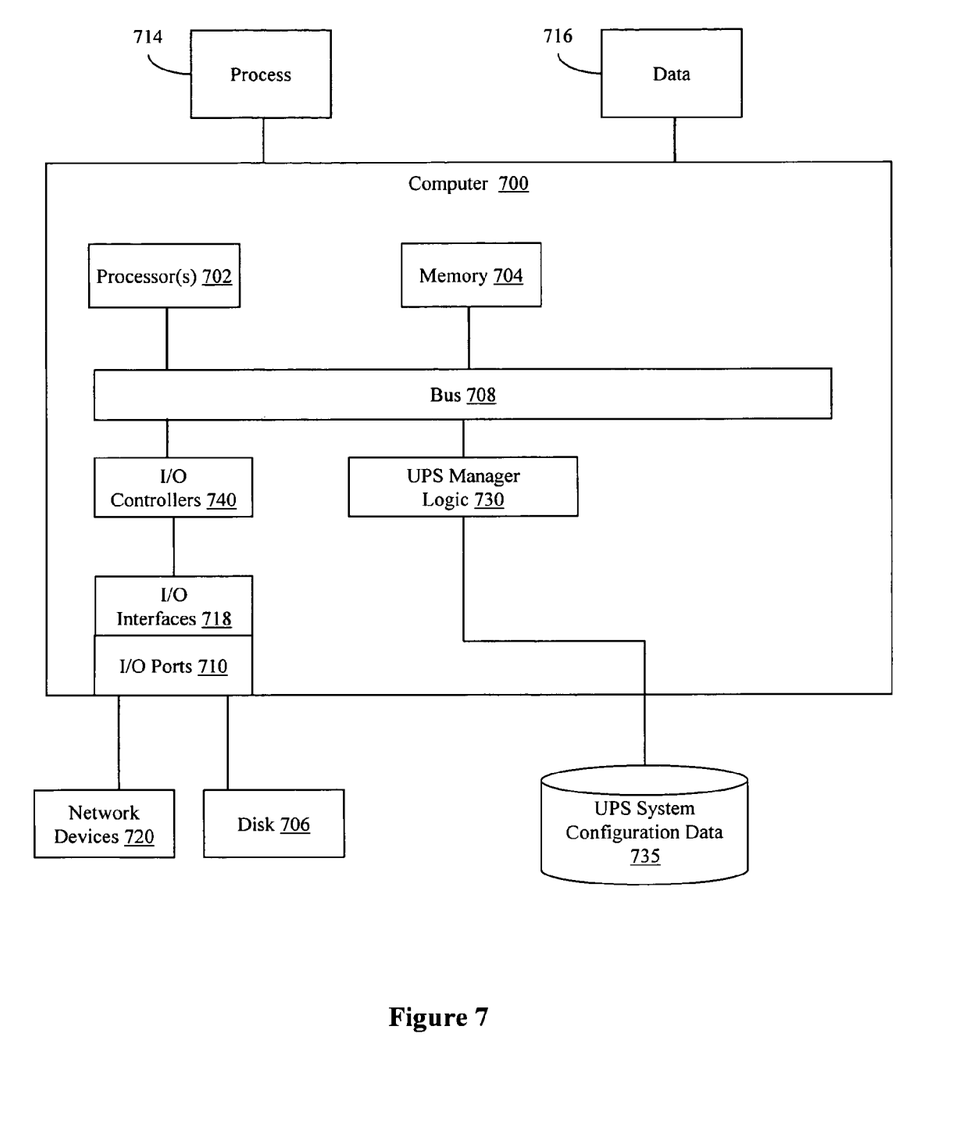
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes one or more processors 702, a memory 704, and input/output ports 710 operably connected by a bus 708. In one example, the computer 700 may include a UPS manager logic 730 configured to facilitate management of power from UPSs and notification of power loss and power resumption. The UPS manager logic 730 can be implemented similar to the power management logic 100 described in FIG. 1, the UPS manager logic 200 and/or 300 described in FIGS. 2 and 3, respectively, and/or other systems and methods described herein. The UPS manager logic 730 can also be configured to manipulate and control a UPS system configuration data 735 similar to the system configuration data 330 described in FIG. 3, and its equivalents.

Generally describing an example configuration of the computer 700, the processor 702 can be a variety of various processors including dual microprocessor and other multiprocessor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. One or more I/O devices can be connected to the I/O port(s) 710 like a disk 706, or other external device. The disk 706 can include, but is not limited to, devices like a disk array, a magnetic disk drive, a solid state disk drive, a floppy disk drive, a tape drive, a Zip drive, a flash memory card, and/or a memory stick. Furthermore, the disk 706 can include optical drives like a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and the like. The input/output ports 710 can include but are not limited to, serial ports, parallel ports, and USB ports.

The computer 700 can operate in a network environment and thus may be connected to network devices 720 via the I/O interfaces 718, and/or the I/O ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 720 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
   an external peripheral device configured to be powered by a power source and being connected to at least one uninterrupted power supply (UPS) configured to supply power to the external peripheral device if the power source fails;
   a computer system configured to execute at least one operating system instance that functions with the external peripheral device;
   an uninterrupted power supply (UPS) management logic configured to determine a power status of the external peripheral device based on signals from the UPS; and
   the UPS management logic being configured to transmit a power loss notice, based on the power status, to the operating system instance that causes the operating system instance to shut down operation of the external peripheral device while allowing the computer system to continue operating.

2. The system of claim 1, where the power status is determined based on power from the power source and a power supply from the UPS.

3. The system of claim 1, where the operating system instance shuts down operation of the external peripheral device by shutting down an input/output interface that controls communications with the external peripheral device.

4. The system of claim 3 where the input/output interface includes a PCI card.

5. The system of claim 1, where the external peripheral device includes an input/output expansion cabinet operably connected to the computer system.

6. The system of claim 1, where the external peripheral device includes an input/output device operably connected to the computer system.

7. The system of claim 1, where the external peripheral device includes at least one disk array operably connected to the computer system.

8. The system of claim 1, where the power source includes an alternating current power source that powers the external peripheral device as a separate power source from the computer system.

9. The system of claim 1, where the system includes:
   a plurality of external peripheral devices operably connected to the computer system where the plurality of external peripheral devices are powered by one or more power sources;
   a plurality of uninterrupted power supplies where one or more uninterrupted power supplies are configured to provide backup power to a selected external peripheral device; and
   one or more input/output cards connected to the computer system and being configured to control communication between an operating system instance within the computer system and one or more external peripheral devices.

10. A power management product for a computer system, the product comprising:
    logic configured to maintain system configuration data in a data store that describes associations between external devices, uninterrupted power supplies, and operating system instances, where an external device is powered by a power source and is connected to the computer system, where an uninterrupted power supply is configured to provide backup power to a selected external device, and where an operating system instance is configured to control the selected external device;
    a management logic configured to receive a power loss signal from the uninterrupted power supplies that indicates at least an expiration of backup power;
    the management logic further including logic configured to use the system configuration data from the data store to (1) identify a selected external device that is powered by the uninterrupted power supply that transmitted the power loss signal, and (2) identify an operating system instance that controls the selected external device; and
    a notice logic being configured to transmit a device shutdown notice to the identified operating system instance that indicates an upcoming total power loss for the selected external device, the device shutdown notice being configured to cause the identified operating system instance to shutdown the selected external device.

11. The product of claim 10 where the power lass signal includes data that indicates a time remaining until the backup power from the uninterrupted power supply expires.

12. The product of claim 10 where the power management product can be embodied as one of: a computer-readable medium that provides computer executable instructions, a computer component separate from the computer system, a computer component of the computer system, a software application executable on the operating system instance, or a firewall configured to isolate internets between multiple operating system instances that may execute on the computer system.

13. In a computer system that comprises at least one operating system instance configured to control an external device connected to the computer system, where the external peripheral device is configured to be powered by a power source and includes at least one uninterrupted power supply (UPS) connected to the external device for providing a backup power to the external device, a method comprising:
    notifying the at least one operating system instance of an upcoming total power loss for the external device; and
    performing a shutdown of the external device before the upcoming total power loss of the UPS connected to the external device so that data can be saved and the at least one operating system instance can continue operation without the external device.

14. The method of claim 13 further including:
    monitoring a power stabs from the at least one uninterrupted power supply (UPS), where the power stabs is based on parameters including whether the power source is functioning and an amount of time until the backup power from the UPS expires; and
    determining when the upcoming power loss will occur.

15. The method of claim 14 where the monitoring and notifying is performed by a power management logic that is configured with system data including association data that identifies connections between an external device, a UPS configured to supply backup power to the external device, and an operating system instance that controls the external device.

16. The method of claim 13 where performing a shutdown of the external device includes shutting down an input/output card that is an interface between the at least one operating system and the external device.

17. The method of claim 13 further including:
in response to receiving a power status signal that indicates power has been resumed to the external device, notifying the at least one operating system instance of resumed power for the external device; and
re-establishing operation of the external device.

18. The method of claim 17 where the re-establishing includes performing an on-line add operation for an input/output interface card that controls the external device.

19. A system, comprising:
means for determining a power status of one or more power sources that are connected to and power one or more external input/output devices connected to a computer system;
means for notifying an operating system before a power loss occurs based on the power stats that causes the operating system to shut down a selected external input/output device and allow the computer system to continue functioning; and
means for notifying the operating system, based on the power status, when power is restored to the selected external input/output device to cause the operating system to re-establish operation of the selected external input/output device.

20. A set of application programming interfaces embodied on a computer-readable medium for execution by a computer component in conjunction with an uninterrupted power supply (UPS) management system, the application programming interfaces comprising:

a first interface for allowing a user to access the UPS management system and configure UPS system configuration data, where the UPS management system is configured to maintain, in a data store, the UPS system configuration data relating to UPS devices and connections between the UPS devices and external I/O devices that are connected to a computer system; and a second interface for causing a computer to modify the contents of the data store based on the UPS system configuration data configured by the user.

* * * * *

UNITED STATES PATENT AND TRADEMARK OFFICE
CERTIFICATE OF CORRECTION

PATENT NO. : 7,350,088 B2  
APPLICATION NO. : 11/075409  
DATED : March 25, 2008  
INVENTOR(S) : Michael S. Allison et al.

Page 1 of 1

It is certified that error appears in the above-identified patent and that said Letters Patent is hereby corrected as shown below:

In column 14, line 23, in Claim 11, delete "lass" and insert -- loss --, therefor.

In column 14, line 51, in Claim 14, delete "stabs" and insert -- status --, therefor.

In column 14, line 52, in Claim 14, delete "stabs" and insert -- status --, therefor.

In column 15, line 16, in Claim 19, delete "stats" and insert -- status --, therefor.

Signed and Sealed this

Twenty-second Day of July, 2008

JON W. DUDAS  
*Director of the United States Patent and Trademark Office*